United States Patent [19]

Kim

[11] Patent Number: 5,047,198

[45] Date of Patent: Sep. 10, 1991

[54] COMPRESSION MOLDING OF COMPOSITE PARTS ON HOT MOLD SURFACES WITH A SHORT CYCLE TIME

[75] Inventor: Bang M. Kim, Schenectady, N.Y.

[73] Assignee: General Electric Company, Schenectady, N.Y.

[21] Appl. No.: 569,048

[22] Filed: Aug. 17, 1990

Related U.S. Application Data

[63] Continuation of Ser. No. 361,464, Jun. 5, 1989, abandoned, which is a continuation of Ser. No. 176,114, Mar. 30, 1988, abandoned.

[51] Int. Cl.[5] .................. B29C 43/04; B29C 43/52; B29C 43/34
[52] U.S. Cl. .................................. 264/257; 264/322; 264/348; 264/DIG. 65; 425/89; 249/112
[58] Field of Search .............. 264/257, 258, 319, 320, 264/322, 316, 325, 348, 264, 265, 266, DIG. 65; 425/89; 249/112

[56] References Cited

U.S. PATENT DOCUMENTS

| | | | |
|---|---|---|---|
| 2,263,792 | 11/1941 | Wood | 264/266 |
| 3,274,298 | 4/1966 | Utiger | 264/322 |
| 3,553,784 | 1/1971 | Shuman | 264/322 |
| 3,681,483 | 8/1972 | Moore | 264/322 |
| 3,883,632 | 5/1975 | Petrochko | 264/322 |
| 4,304,751 | 12/1981 | Li | 264/322 |
| 4,306,856 | 12/1981 | Arppol | 264/DIG. 65 |
| 4,372,900 | 2/1983 | Doerfling | 264/DIG. 65 |
| 4,390,489 | 6/1983 | Segal | 264/322 |
| 4,416,716 | 11/1983 | Ichikawa | 264/322 |
| 4,440,702 | 4/1984 | Susnjara | 264/322 |
| 4,595,551 | 6/1986 | Maurer | 264/322 |
| 4,769,202 | 9/1988 | Eroskey | 264/166 |

FOREIGN PATENT DOCUMENTS

| | | | |
|---|---|---|---|
| 0044644 | 4/1981 | Japan | 264/258 |
| 0030324 | 2/1985 | Japan | 264/313 |
| 2177964 | 2/1987 | United Kingdom . | |

OTHER PUBLICATIONS

Plastics World, Aug. 1987, M. Berins, "News Watch", p. 13.

Polym. Plast. Tech. Eng., 26(1); 1-23 (1987); "A New Approach to Low Thermal Inertia Molding", by R. R. Wadhwa and B. H. Kim, pp. 1-22.

Primary Examiner—Jay H. Woo
Assistant Examiner—Jeremiah F. Durkin, II
Attorney, Agent, or Firm—Patrick R. Scanlon; James C. Davis, Jr.; Paul R. Webb, II

[57] ABSTRACT

A molding system utilizes a cold mold with a large thermal mass and contoured thin mold inserts with a low thermal mass. A composite sheet blank of glass fibers in a thermoplastic matrix resin is placed between the inserts, heated and then transported to the cold mold. The composite sheet is pressed in the cold mold between the mold inserts to flow form and then cool the part. The mold inserts keep the surfaces of the composite sheet hot during the forming process, thereby enabling the matrix resin to flow and form smooth surfaces.

5 Claims, 9 Drawing Sheets

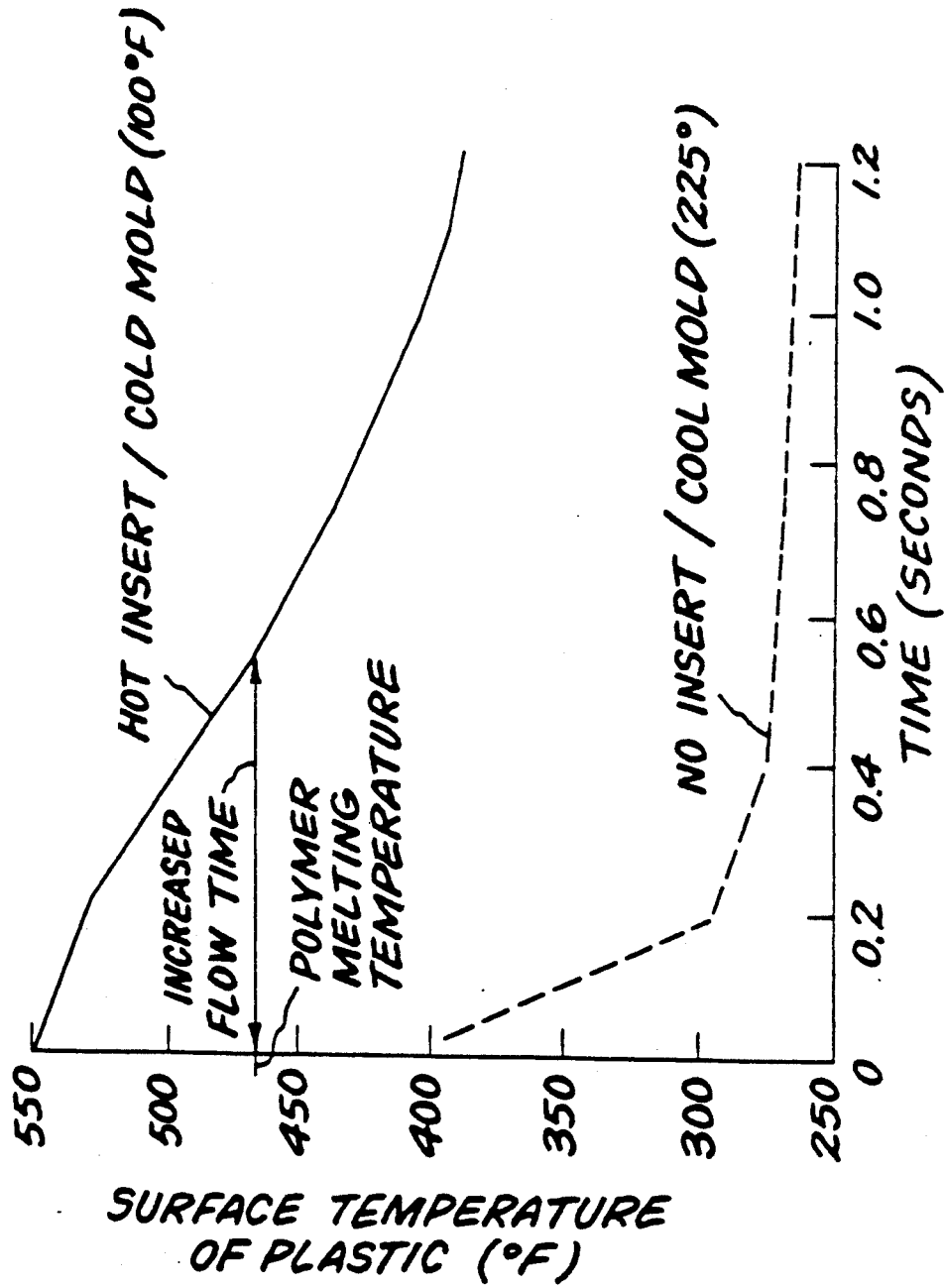

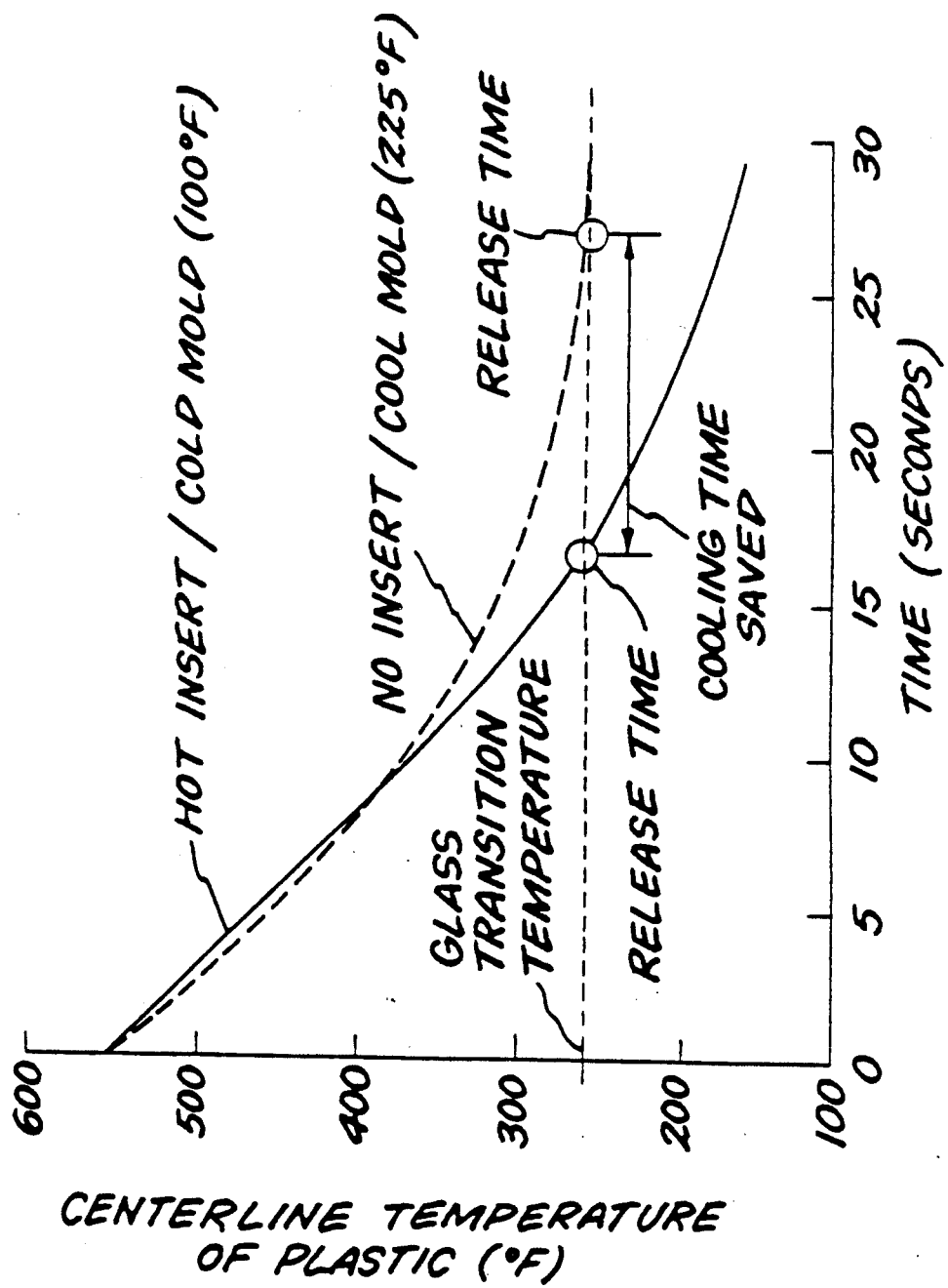

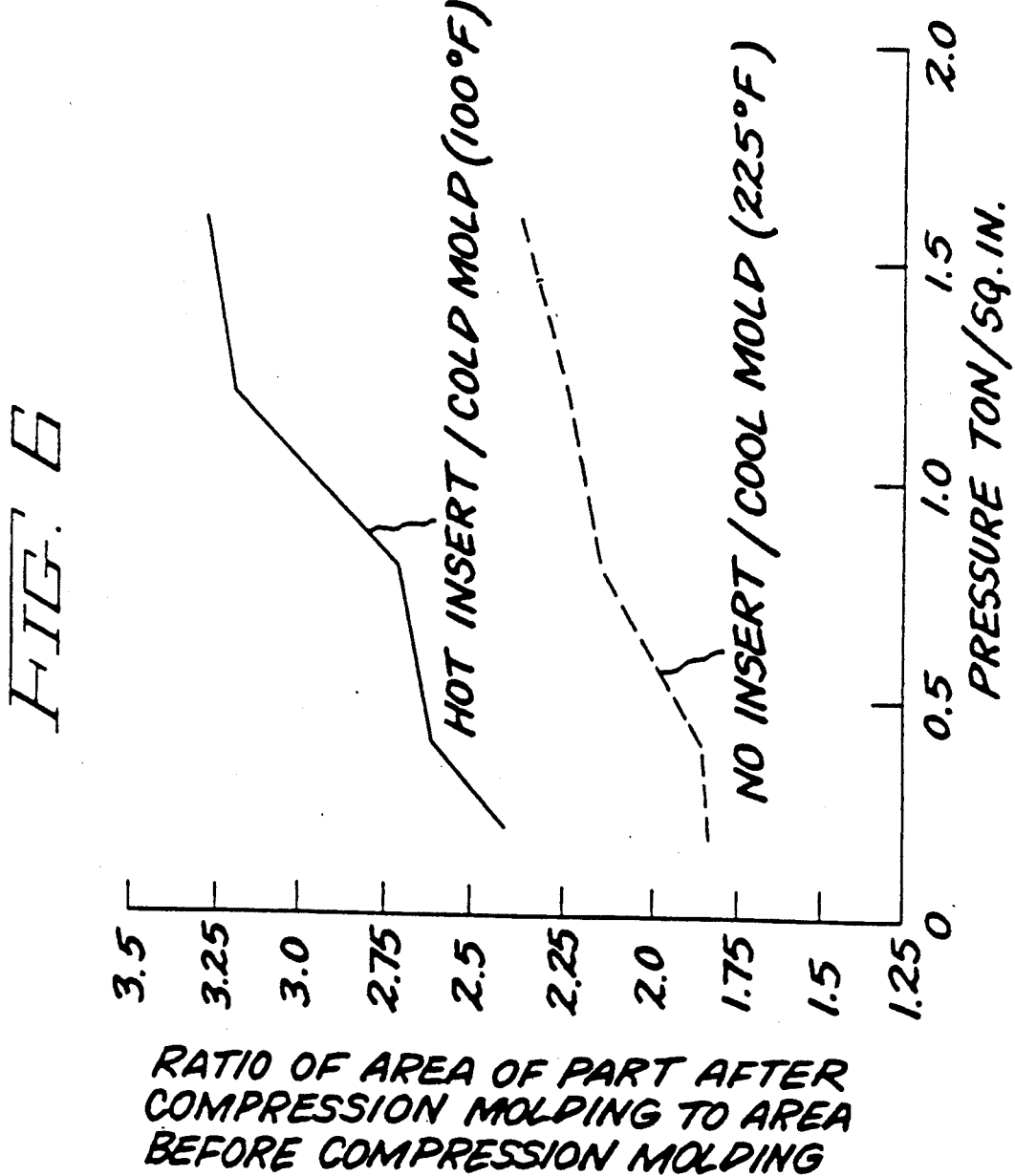

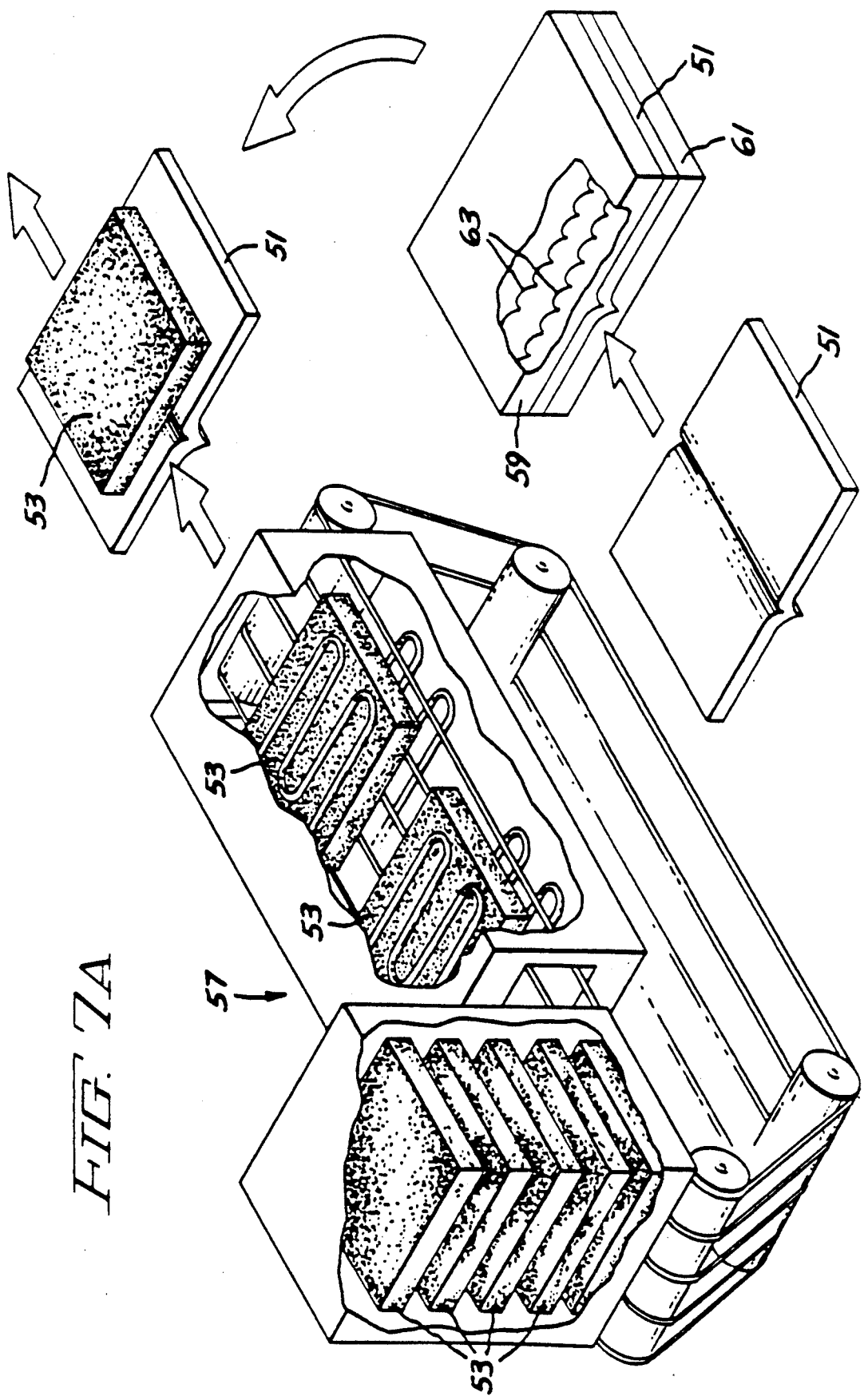

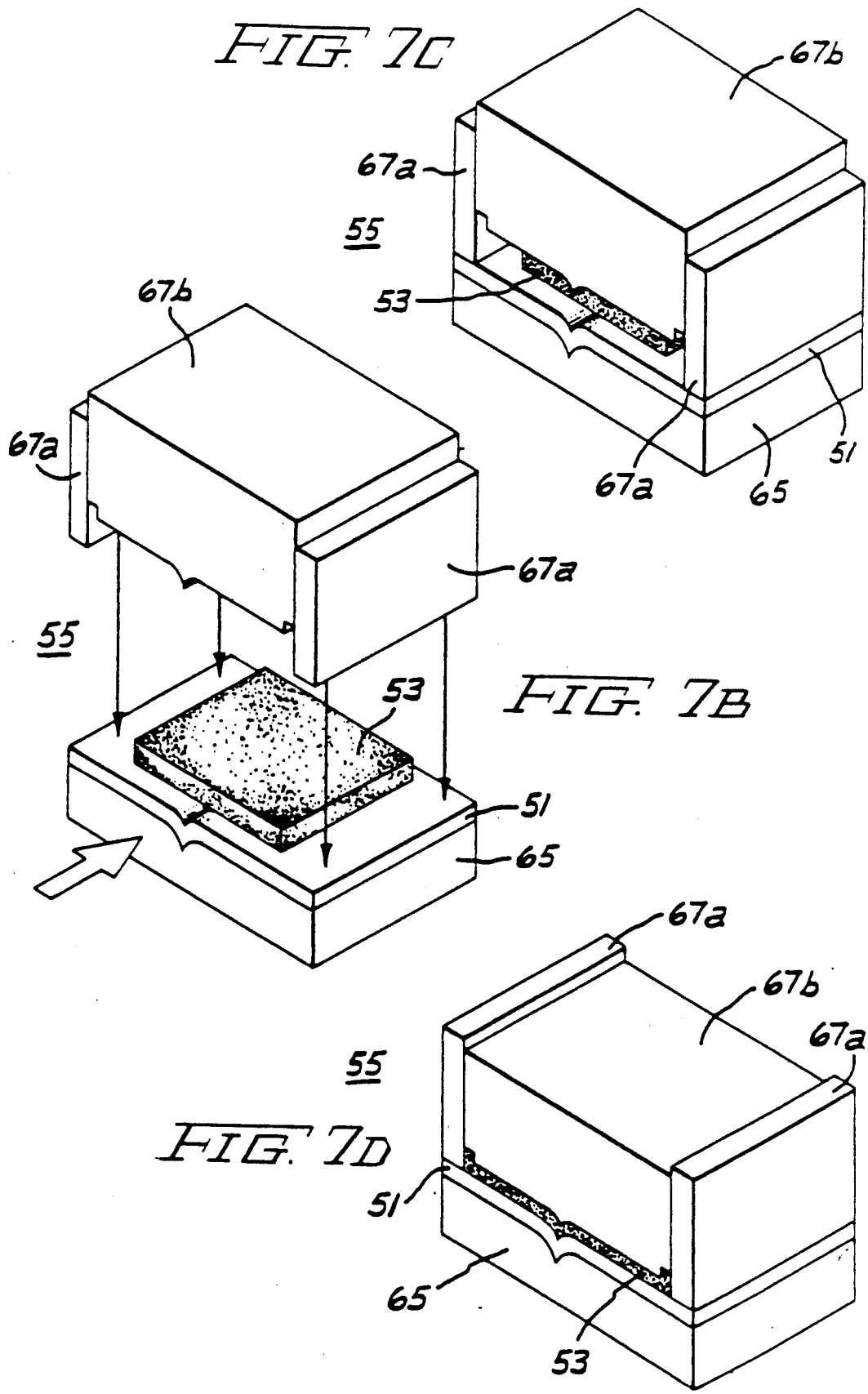

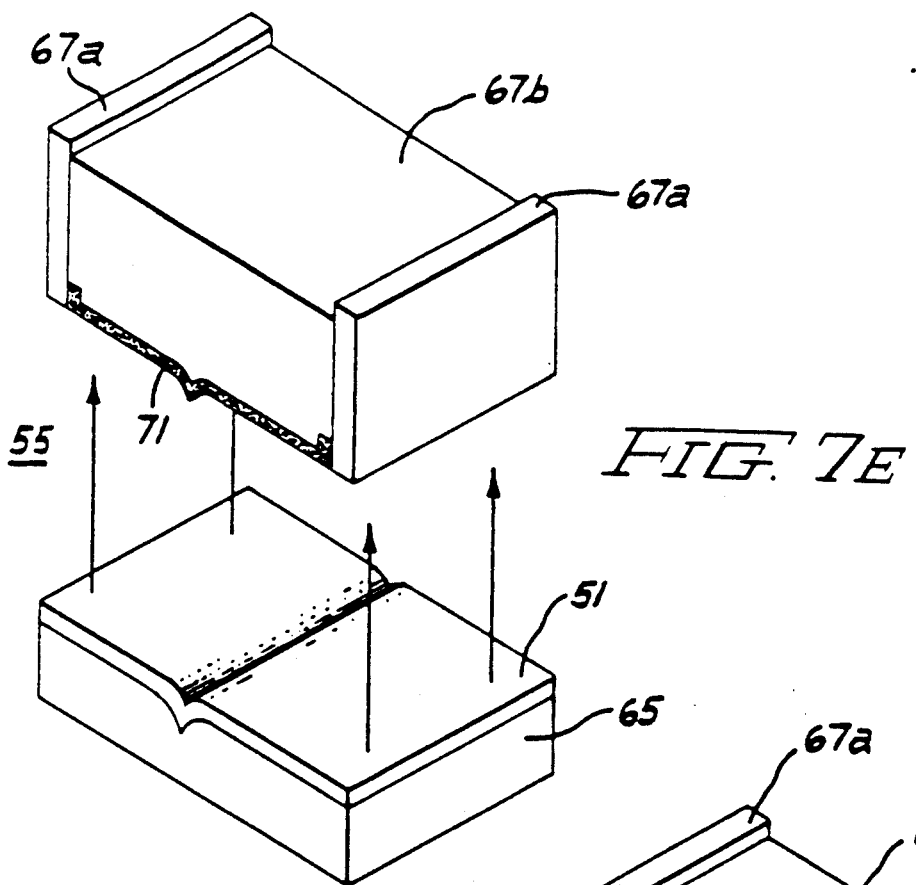
FIG. 7E
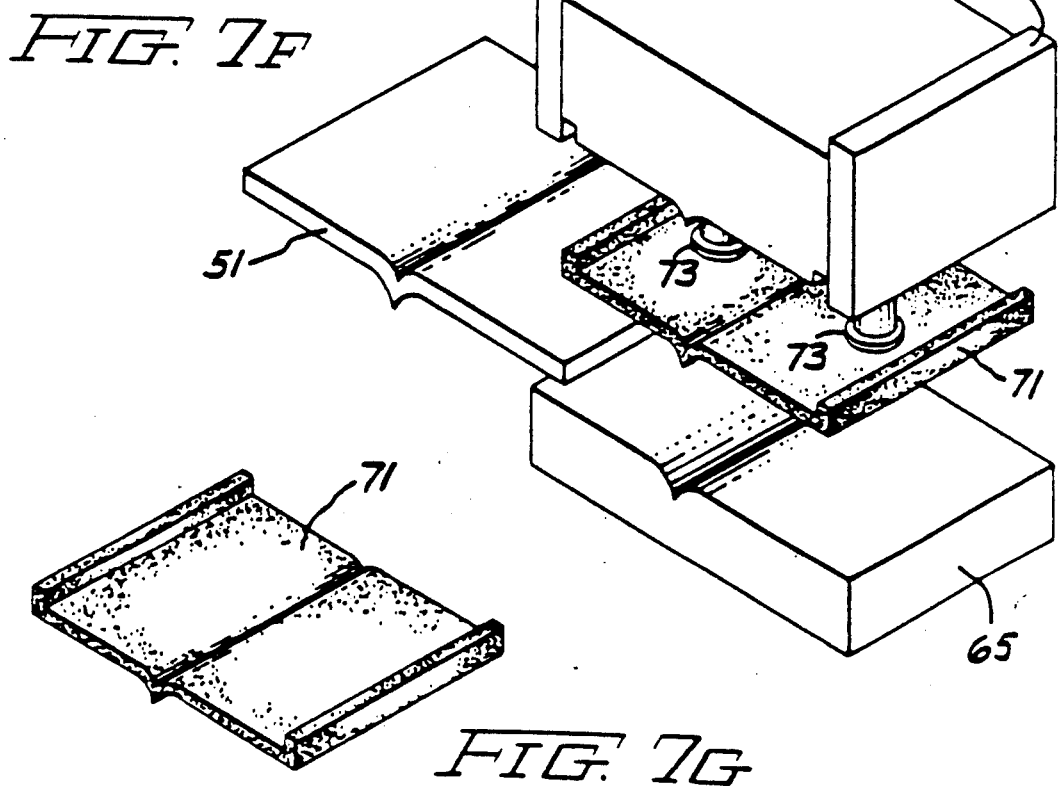
FIG. 7F
FIG. 7G

COMPRESSION MOLDING OF COMPOSITE PARTS ON HOT MOLD SURFACES WITH A SHORT CYCLE TIME

This application is a continuation of application Ser. No. 07/361,464, filed June 5, 1989 and now abandoned which is a continuation of application Ser. No. 07/176,114 filed Mar. 30, 1988 and now abandoned.

CROSS REFERENCE TO RELATED APPLICATIONS

This application is related to copending application entitled "Multilayer Composite Mold Structure for Molding on Hot Surfaces", Ser. No. 07/175,078, now abandoned, and "Compression Molding Using Insulating Films", Ser. No. 07/176,116 now abandoned, both assigned to the same assignee as the present invention.

BACKGROUND OF THE INVENTION

The present invention is related to a method for compression molding plastics.

Compression molding of glass reinforced thermoplastic sheets is a promising method for producing relatively thin, wide and strong parts such as car hoods, doors and panels. One important prerequisite for the use of glass reinforced composite products in automobile applications is a Class A surface. While there is no universally accepted specification, the Class A surface is a glossy, smooth and polished surface which should be as smooth as that of current automobile exterior parts made from sheet metal.

Current molding processes of glass reinforced thermoplastic composite sheets begins with the heating composite blanks in an oven, typically in infrared or hot air convection ovens. The material is heated above its melting point or if an amorphous material at least substantially above its glass transition temperature. The hot blanks are then pressed between cool mold surfaces (surfaces lower than the melting point or the glass transition temperatures), which are typically 175°–250° F. A molding pressure of one half ton/sq. in. to two tons/sq. in. is applied to the mold during a typical cycle time of 45–60 seconds.

When the composite blanks are heated, they expand (loft) due to the recoil forces within the fibers. The surface of the expanded blanks then cools during its transfer to the mold, resulting in "frozen" resins on the surface. Compression of this blank in the cool mold produces surfaces which are not completely filled with resins, although some hot molten material moves from the inner core to the surface. This creates unfilled areas in the form of exposed fibers and surface porosity or voids. Since the resin at the cold surface is frozen and does not flow, rough boundaries between charged and newly formed areas are also produced. These exposed fibers, porous areas and blank boundaries are the major manifestations of surface roughness, although other physical processes, such as differential thermal shrinkage between fibers and resins, can also result in surface roughness and/or waviness.

Recently it has been found that smooth surfaces can be obtained from neat resin in blow molding by using hot surface molding. The resin is supplied hot to the mold as a parison in blow molding or injected into the mold in injection molding. These techniques, which are based on temperature cycling of mold surfaces, increase the cycle time of the process. The increased cycle time is the major disadvantage of these techniques. In addition, composite sheets with continuous mat fibers cannot easily be injected or supplied as a parison. Heating of composite sheets causes the fibers to loft and extend outside the polymer resin matrix. Attempts to obtain smooth surfaces with composite sheets have involved trying to change the structure of the composite sheets so that the outside layers on the composite sheets have neat resin with barrier layers sometimes being provided to prevent the fibers situated in the middle layers from coming to the surface. These sheets could then be molded using conventional compression molding techniques.

It is an object of the present invention to provide a method of compression molding reinforced thermoplastic composite sheets which result in finished products with smooth surfaces, a minimum of exposed fiber, porosity, and blank boundaries.

It is a further object of the present invention to provide a method of compression molding reinforced thermoplastic parts which results in short cycle times and therefore increased throughput for each press.

It is still a further object of the present invention to provide a method of compression molding reinforced thermoplastic composite sheets which reduces the required molding pressure and therefore reduces press size, which is particularly significant in large part fabrication.

It is another object of the present invention to provide a method of compression molding reinforced thermoplastic which results in reduced thermal decomposition of the thermoplastic resins.

It is yet another object of the present invention to provide a method of compression molding reinforced thermoplastic sheets which preserve the original sheet structure after molding.

SUMMARY OF THE INVENTION

In one aspect of the present invention a method of compression molding reinforced thermoplastic composite sheets to obtain smooth surface finishes and short cycle times is provided. The method comprises the steps of heating the composite sheet above the temperature which the matrix material in the composite sheet becomes molten and heating a mold insert having the desired contour of the molded composite sheet. The heated composite sheet is placed on the heated mold insert and transported on the mold insert to a cooled mold. The mold insert and composite sheet are placed in the mold with the mass of the insert being much less than the bottom half of the mold upon which it is placed. The mold is then closed, the composite sheet and insert having been heated sufficiently and the insert having sufficient mass to allow the thermoplastic resin to flow and fill the insert. The molded composite sheet is allowed to cool inside the mold. The mold is then opened with the molded composite sheet as well as the mold insert removed.

BRIEF DESCRIPTION OF THE DRAWING

The subject matter which is regarded as the invention is particularly pointed out and distinctly claimed in the concluding portion of the specification. The invention however, both as to organization and method of practice, together with further objects and advantages thereof, may be best understood by reference to the following description taken in conjunction with the accompanying figures in which:

FIG. 4 is a graph showing a comparison of the calculated surface temperature decay of a composite material containing a crystalline polymer after mold closing, when molded in a cool mold press and when molded in a cold mold press with heated inserts;

FIG. 5 is a graph showing a comparison of the calculated temperature decay comparison at the centerline of a composite material containing an amorphous polymer after mold closing, when molded in a cool mold press and when molded in a cold mold press with heated inserts;

FIG. 6 is a graph of the required mold pressure per square inch for different amounts of blank elongation for a cool mold and a cold mold using heated inserts; and FIGS. 7A-G are an isometric representation of another embodiment of the steps of compression molding reinforced thermoplastic in accordance with the present invention.

DETAILED DESCRIPTION OF THE INVENTION

Figure 1:
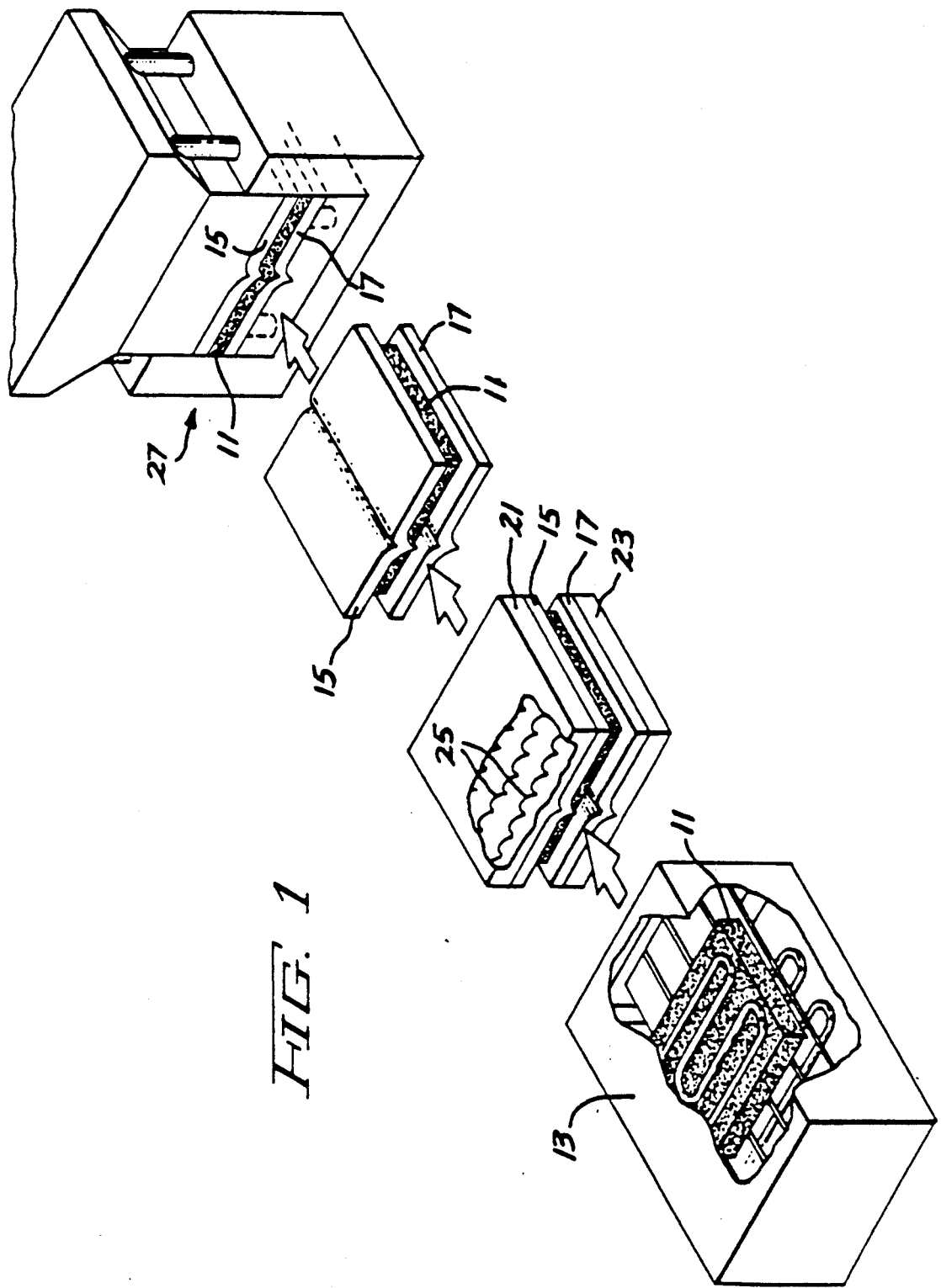
FIG. 1 is an isometric representation of the steps of compression molding reinforced thermoplastic composite sheets to obtain smooth surface finishes in accordance with the present invention.

Referring now to the drawing and and particularly FIG. 1 thereof. A composite sheet 11 comprising thermoplastic resin, including reinforcing layers, is shown being preheated to approximately the glass transition temperature of the resin in an oven 13. Oven 13 can comprise a convection oven as shown or an infrared oven. Preheating allows the sheet 11 to soften to conform to the contours of mold inserts 15 and 17 when it is placed between the two thin mold inserts. The composite sheet can comprise, for example, approximately 30-40% glass fiber mat and 70-60% polymer resin. The glass fiber mats can be fabricated from continuous strands sized with a sizing compatible with a matrix resin being used. Depending on the application, a variety of polymer matrices such as polycarbonate, polyesters, polypropylene, polyamide polyimides, polyphenylene oxide, polystyrene and blends of the above can be used. The mold inserts 15 and 17 with the sheet 11 in between are then further heated above the temperature at which the matrix material in the composite sheet becomes molten, preferably by conduction heating between plates 21 and 23 containing heating elements 25. The temperature of the sheet will exceed the glass transition temperature if an amorphous resin is being used or exceed the melting point if a crystalline resin is being used. The mold inserts 15 and 17 can be fabricated from a material which can withstand the compression forces at elevated temperatures at which the composite material melts without distorting and has a smooth surface for shaping the composite materials. Examples of such materials are metals, ceramics, high temperature plastics, plastic composites. Conduction heating of the mold inserts is preferred over convection or infrared heating because of the faster heat transfer. The inserts with the sheet in between are transported then to a press 22 and between the cold upper and lower mold halves of a cold press 27 and compressed. The mold halves can comprise tool steel or to reduce cost can comprise a softer less expensive material such as aluminum or plastic composites. Since the mold inserts are used in direct contact with the composite, the mold halves are not subjected to wear by the material to be molded. The mold halves with which the hot inserts come in contact are maintained at approximately 100° F. by liquid cooling through passageways (not shown) in the mold halves, not shown. Initially, the resins in contact with the hot mold inserts remain molten and fill the insert mold surface under pressure. The composite part and mold inserts cool in the cooled mold halves. The composite product is released from the mold inserts and the mold inserts reused. If only one smooth surface is required, one mold insert may be sufficient. The optimum thickness of the mold insert is determined by the minimum mass required to provide hot surfaces, the cooling time desired and the mechanical strength needed to withstand the compression molding process.

Figure 2:
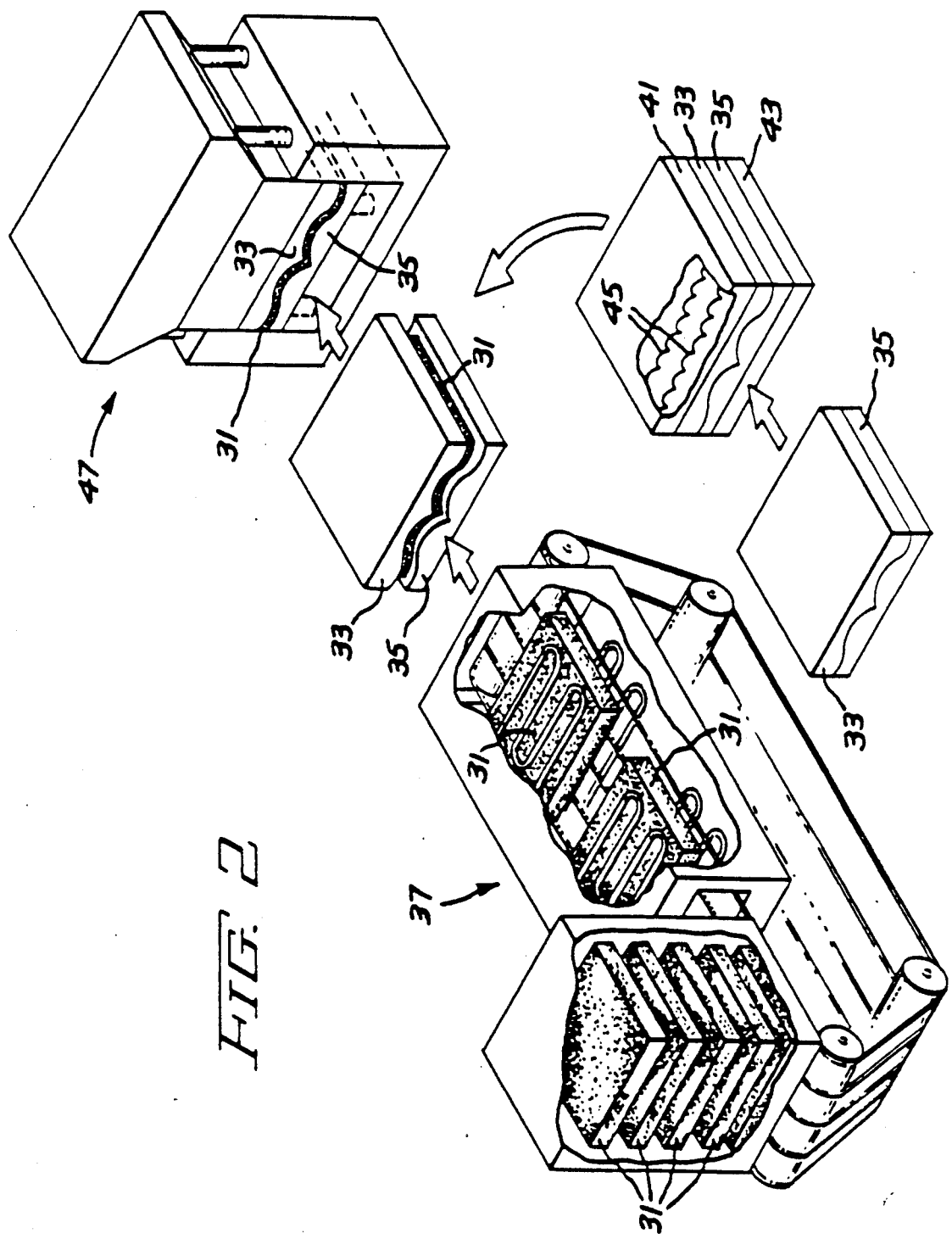
FIG. 2 is an isometric representation of another embodiment of the method of compression molding reinforced composite sheets in accordance with the present invention.

Another embodiment of the present invention is shown in FIG. 2. A composite sheet blank 31 and mold inserts 33 and 35 are heated separately. The blank may be heated in a infrared or convection oven above the temperature which the matrix material in the sheet becomes molten, which is above the melting point of the resin if a crystalline material is used or above the glass transition temperature if an amorphous material is used. A tunnel convection oven 37 is shown providing a steady supply of heated blanks. Heating the blanks allows the glass fibers to loft. The blank is then placed between preheated inserts which have been heated between plates 41 and 43 containing heating elements 45. The inserts and blank are transported to a cooled press 47 and compressed. The mold inserts 33 and 35 are shown with a varying wall thickness profile which simplifies the design of the molding system. It has been found that a simple shape can be used at the interface between the cold mold halves 48 and 49 and the mold inserts based on tests of mold inserts with different wall thicknesses. Varying thickness mold inserts resulted in good resin flow and filling of resins at the surface of the part molded. The composite was free of exposed fibers, porosity and blank boundaries. The surface of the molded part was a reproduction of that of the mold insert.

The surfaces of composite parts distributed fibers throughout the sheet produced by hot surface molding of composite sheets. The molded parts were analyzed using a mechanical profilometer (Feinpruef Model M4P). Table 1 shows the comparison of the average roughness and the peak-to-valley height of composite parts produced by hot surface molding and cold surface molding. Samples made by hot surface molding with fine fibers and coarse fibers had an average roughness of 8.4 and 9.4 microinches and a peak to valley height of 65 and 78 microinches. Compared to values of 30 and 47.5 microinches respectively, for average roughness and 400 and 450 microinches for peak-valley height respectively, on parts made by the cold surface molding. The significant reduction in surface roughness is due to elimination of imperfections such as exposed fibers, porosity and voids at the surfaces.

The shape of the contact area between the mold inserts and the cold mold halves is important because of the thermal shrinkage that occurs to the mold inserts when cooling. Since the shape of the portion of the mold insert contacting the mold halves does not have to conform exactly to the mold insert contours, a simple geometry which provides good contact between the cold mold halves and surface element can be used.

TABLE 1

| Comparison of Surface Roughness | | |
|---|---|---|
| | Average Roughness (micro. in.) | Average Peak Valley Height (micro in.) |
| Hot Surface Molding | | |
| fine fiber composite | 8.4 | 65 |
| coarse fiber composite | 9.4 | 78 |
| Cold Surface Molding | | |
| fine fiber composite | 30 | 400 |
| coarse fiber composite | 47.5 | 450 |

Figure 3:
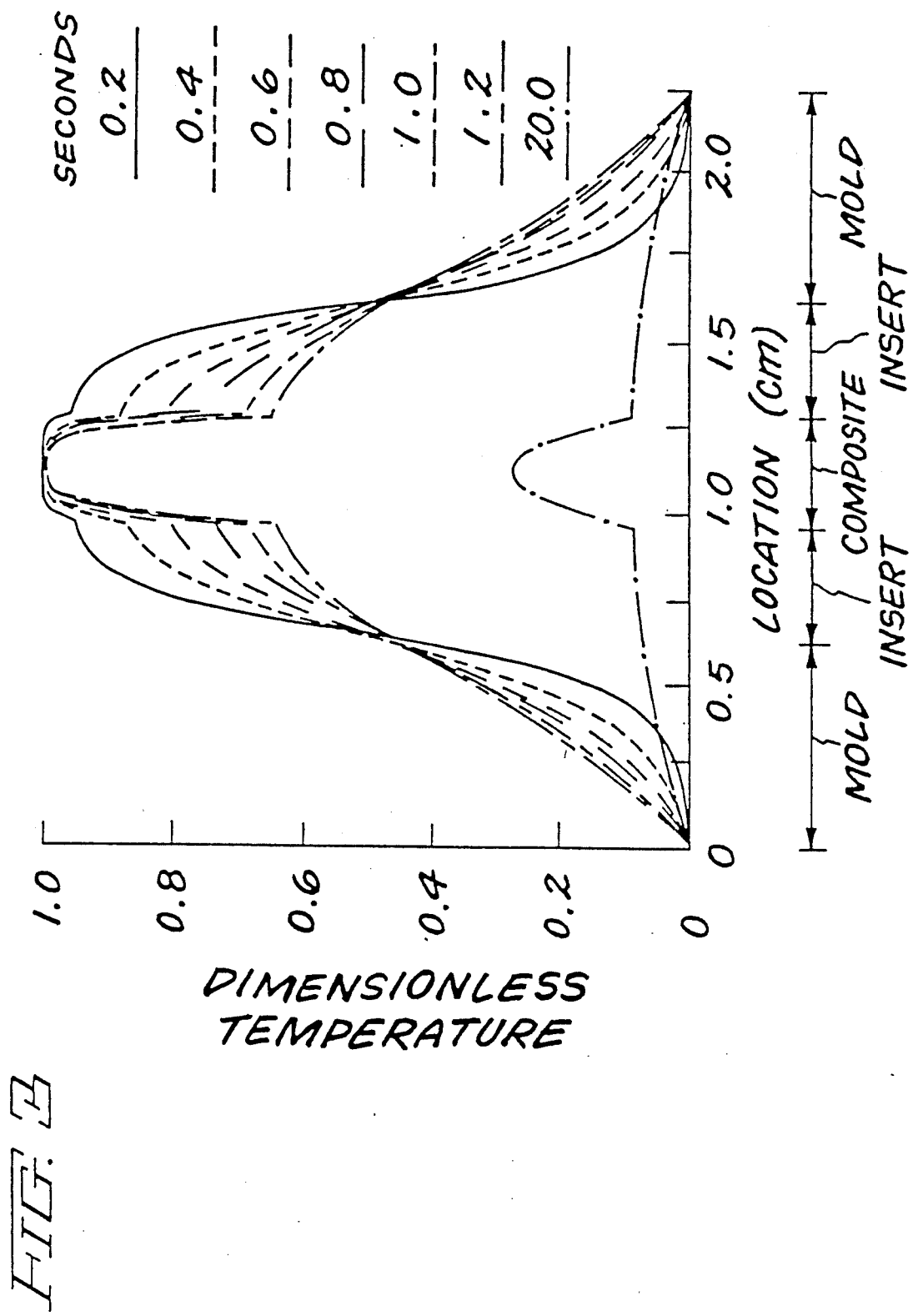
FIG. 3 is a graph of the transient temperature profile of heated ⅛" mold inserts surrounding a heated composite blank in a compression mold immediately after mold closing.

A one dimensional transient heat transfer mathematical analysis was made on a multilayer system comprising five layers; mold/insert/composite/insert/mold. The heat transfer between the insert and the composite was assumed to take place by conduction. The temperature profile of a ⅛" composite sheet situated between two ⅛" metal mold inserts in contact with a cooled mold is shown in FIG. 3. Dimensionless temperature was used in the calculations with dimensionless temperature defined by the ratio $((T-T_c)/(T_i-T_c))$, where $T$, $T_i$ and $T_c$ stand for temperature as a function of time and location, initial temperature, and boundary temperature, respectively. A constant boundary condition was used where the mold inserts were assumed to be heated to 550° F. ($T_i$) and cooling fluid in the cooled mold, with which the mold inserts where in contact, provided a constant temperature of 100° F. ($T_c$) at a distance of ¼ inch from the mold insert surface.

Thermal conductivities of composite sheets were measured for use in the calculations and the thermal conductivities of composites made with continuous fiber mats were much higher than both the neat resin and short fiber filled composites. The composites were assumed to have a 40% fiber mat content.

If the resin used as a matrix in the composite material is polybutylene terephthalate available from a General Electric Co. as Valox® thermoplastic with a melting point of 450° F., its dimensionless temperature is 0.8. Referring to the FIG. 3 the melting temperature is maintained at the mold insert surface for 0.6 seconds. The temperature of the resin further away from the metal surface is maintained above the melting point, longer than 0.6 seconds. If a high speed press fills the mold surface with resin during this time period, the surface will be free of voids. Using a maximum temperature of 250° F. as the desired final sheet temperature during cooling before release from the mold, cooling can be accomplished within 20 seconds. If the resin in the composite material is bisphenol A based polycarbonate an amorphous material with a glass transition temperature of 284° F., available from the General Electric Company as Lexan® 141 thermoplastic, the glass transition temperature is equivalent to 0.4 on the dimensionless temperature scale. A high speed press could fill the mold surface with resin during the period of time that the metal surface is maintained above the glass transition temperature and the surface will be free of voids. If a maximum temperature of 250° is again used as the desired final temperature during cooling before release from the mold, cooling can then be accomplished within 20 seconds. This indicates that the use of a hot mold insert fabricated from ⅛ inch metal sheets makes it possible to mold composite sheets free of voids.

A comparison of the calculated temperature decay of the surface of a composite sheet including a crystalline polymer in both a cold mold press with hot inserts and a cool surface press without inserts is shown in FIG. 4. The temperature used in the calculations are 550° F. for the preheat temperature of the composite sheet and mold inserts, 225° F. for the mold surface temperature in the cool surface molding, and 100° F. for the mold temperature of the cold mold into which the mold inserts are placed. Initially, the temperature of the metal surface in contact with the composite sheet during hot surface molding with hot mold inserts is much higher than during cool surface molding allowing increased flow time of the polymer resin achieving a smooth surface without voids.

Referring now to FIG. 5 a comparison of the calculated temperature decay of the centerline of a composite sheet including a crystalline polymer in both a cold mold press with hot inserts and a cool surface press without inserts is shown. The temperatures use in the calculations are the same as used in connection with FIG. 4, 550° F. for the preheat temperature of the composite sheet and mold inserts, 225° for the mold surface temperature in the cool surface molding and 100° F. for the mold temperature of the cold mold into which the mold inserts are placed. Initially, the temperature of the centerline of the composite material between the hot inserts and in the cool mold are the same. As cooling continues, the temperature in the middle of the composite in the hot surface molding process cools more rapidly than in the cool surface mold, showing that it is possible to have a shorter cycle time with the hot mold insert than with conventional cool surface molding.

The use of a thicker insert, ¼ inch for example, does not result in much of an increase in cooling time (17-20 seconds in this case) when a mold insert fabricated of high thermoconductivity material such as metal is used. Increasing the composite thickness to ¼ inch however, increases the cooling time to almost a minute, while the time the composite surface temperature remains higher than its melting temperature stays the same.

The temperature selected for the cooled mold can be in the range of 50° to 300° F. The lower the temperature the quicker the cycle time. However, for smooth surfaces the resin must be molten during press closing limiting the temperature selected. The cool mold temperatures in the upper part of the range are used with resins having high glass transition temperatures while the temperatures in the lower portion of the range are used with resins having low glass transition temperatures.

Referring now to FIG. 6, the reduced pressure requirement in compression molding for hot surface mold inserts in a cold mold and a conventional cool mold is shown. For all the ratios of area of a part after compression molding to area of a part before compression molding, it is seen that the compression molding can be accomplished at reduced pressure when the hot surface insert mold technique is used. The reduced pressure requirement results from the higher composite sheet temperature in the early molding stages and resulting slow initial cooling at the composite surface.

Referring now to FIGS. 7A-G another embodiment of the present invention is shown. A single mold insert 51 is used as a carrier to transport a hot composite sheet 53 to the press 55. The composite sheet is heated above the temperature at which the resin used as a matrix material becomes molten in an infrared or convection oven. A convection tunnel oven 57 is shown in the Figure. The single mold insert 51 is preferably heated by conduction heating between plates 59 and 61 which are heated by electrical resistance heating 63, for example. The heated sheet is then situated on the heated mold insert and transported to the press where it is placed on the fixed bed 65 of the press 55. The press 55 is shown with a two part movable head 67a and 67b. The press fixed bed and upper mold half core are cooled by cooling passages 69 carrying cooling liquid. As the press closes, as shown in FIG. 7C, the first part of the movable head 67a, located on either side of the upper mold half 67b, contacts the mold insert 51, clamping it in place against the fixed bed of the press. The second part of the movable head 67b containing the upper mold half presses the sheet 53 as seen in FIG. 7D. When the press opens as shown in FIG. 7E, the shaped composite part 71 is lifted with the upper mold half, ejector pins 73 shown in FIG. 7F in the upper mold half release the shaped composite part 71 which is shown in FIG. 7G with its smooth defect free surface facing down. The mold insert is removed and used again.

The use of the mold insert to transport the heated sheet blank from the oven to the press is another important feature of this invention. Since the heated sheet blank is very flexible, a carrier which supports it, is required, particularly when transporting a large blank. The insert can be used as a carrier for this purpose.

Mold inserts in contact with the composite blank reduce surface cooling of the blank during its transfer from the oven to mold. While composites can be heated to a higher initial temperature to compensate for cooling which occurs when mold inserts are not used, thermal decomposition of the resin in the composite sheet will increase due to the longer heating times, higher temperatures, and increased exposure to air. The use of mold inserts allows plastics with a narrow operating range of temperature to be more easily accommodated.

The foregoing has described a method of compression molding reinforced thermoplastic composite sheets which result in finished products with smooth surfaces and a minimum of exposed fiber, porosity and blank boundaries. Parts can be formed using the present invention that require short cycle times and reduced molding pressures.

While the invention has been particularly shown and described with reference to several preferred embodiments thereof, it will be understood by those skilled in the art that various changes in form and detail may be made without departing from the spirit and scope of the invention.

What I claim is:

1. A method of compression molding a reinforced thermoplastic sheet to obtain a part with a desired surface finish in a short cycle time, comprising the steps of:
   placing the composite sheet between nondeformable mold inserts having a thickness of one sixteenth to one quarter of an inch and having the desired contour of the part to be molded;
   conduction heating the composite sheet and mold inserts above the temperature at which the thermoplastic material in the composite sheet becomes molten;
   transporting the composite sheet between the mold inserts to a mold cooled to a temperature lower than that at which the thermoplastic sheet solidifies;
   placing the mold inserts and composite sheet in the mold;
   closing the mold, the composite sheet and inserts having been heated sufficiently and the inserts having sufficient mass to allow the thermoplastic resin to flow and fill the mold inserts during mold closing;
   allowing the molded composite sheet to cool;
   opening the mold and removing the molded composite sheet and the mold inserts and
   separating the molded composite sheet from the mold inserts.

2. The method of claim 1 wherein said composite sheet comprises approximately 30-40% continuous fiber mat in a thermoplastic resin matrix.

3. The method of claim 2 wherein the cooled mold is maintained in the range of 50° to 300° F.

4. The method of claim 3 wherein the mold insert is fabricated from a metal, ceramic, or plastic composite.

5. The method of claim 1 further comprising the step of reusing the mold inserts for compression molding reinforced thermoplastic composite sheets.

* * * * *